(12) United States Patent
Liu et al.

(10) Patent No.: US 7,272,673 B2
(45) Date of Patent: Sep. 18, 2007

(54) SIGNAL GENERATING CIRCUIT CAPABLE OF GENERATING A VALIDATION SIGNAL AND RELATED METHOD THEREOF

(75) Inventors: Chuan Liu, Hsin-Chu (TW); Chuan-Cheng Hsiao, Hsin-Chu (TW); Jeng-Horng Tsai, Kao-Hsiung (TW)

(73) Assignee: Mediatek Inc., Hsin-Chi Hsien (TW)

( * ) Notice: Subject to any disclaimer, the term of this patent is extended or adjusted under 35 U.S.C. 154(b) by 175 days.

(21) Appl. No.: 11/163,899

(22) Filed: Nov. 3, 2005

(65) Prior Publication Data
US 2007/0096837 A1    May 3, 2007

(51) Int. Cl.
*G06F 3/00* (2006.01)

(52) U.S. Cl. ...................................................... 710/29
(58) Field of Classification Search ............... 710/1, 710/29; 331/25, DIG. 2
See application file for complete search history.

(56) References Cited

U.S. PATENT DOCUMENTS

| 5,142,247 A | 8/1992 | Lada, Jr. et al. |
| 5,347,232 A | 9/1994 | Nishimichi |
| 5,499,384 A * | 3/1996 | Lentz et al. .................. 710/1 |

\* cited by examiner

*Primary Examiner*—David Mis
(74) *Attorney, Agent, or Firm*—Winston Hsu (57) ABSTRACT

A signal generating system for generating a validation signal includes: a phase lock loop (PLL) for locking an output clock to a specific clock frequency; and a digital signal generation circuit. The digital signal generating circuit includes: a triggering circuit, electrically coupled to the PLL, for determining whether the output clock of the PLL is in a frequency range, and outputting a triggering signal if the output clock is in a frequency range; and a signal generating device, electrically coupled to the triggering circuit and the PLL, for generating the validation signal according to the output clock when receiving the triggering signal; wherein before the output clock is in the frequency range, the PLL continuously outputs the output clock.

33 Claims, 6 Drawing Sheets

SIGNAL GENERATING CIRCUIT CAPABLE OF GENERATING A VALIDATION SIGNAL AND RELATED METHOD THEREOF

BACKGROUND

The invention relates to a signal generating circuit and related method thereof, and more particularly, to a signal generating circuit for generating a validation signal and related method thereof.

In today's computer systems, because the processing speed of the CPU has improved, the transmission efficiency of each interface becomes a more important key point. As known by those skilled in the art, IDE interface was originally utilized in the computer system. However, in order to provide higher transmission efficiency, a new interface, the serial ATA (SATA) interface, is now disclosed. Utilizing the SATA interface is no doubt improving the data access efficiency such that a user doesn't have to spend so much time to store data in SATA devices (such as an SATA hard disk). In other words, the SATA interface may be a new generation of computer interface.

Figure 1:
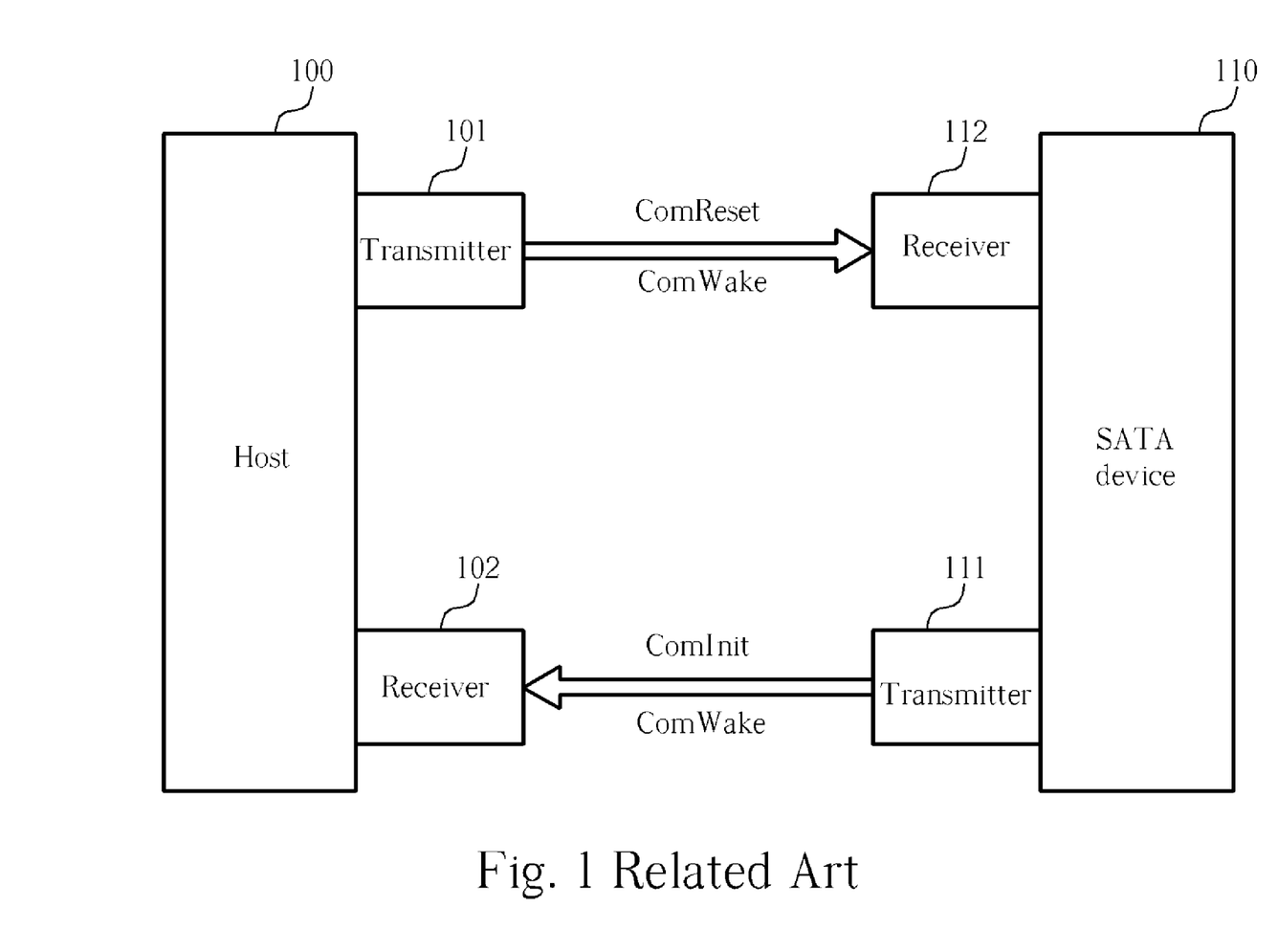
FIG. 1 is a simplified diagram depicting a host and a SATA device according to the related art.

When the computer host must communicate with a SATA device, it is well known that the computer host and the SATA device must first establish the SATA channel. That is, the handshaking mechanism between the SATA device and the host has to be set up first. In order to establish the above-mentioned handshaking mechanism, please refer to FIG. 1 that shows a simplified diagram of a host 100 and a SATA device 110 according to the related art. As shown in FIG. 1, firstly, the host 100 sends a signal ComReset through the transmitter 101 of the host 100. The SATA device 110 receives the signal ComReset from the receiver 112 of the SATA device 110 and then detects whether the signal ComReset is correct. If the SATA device detects that the received signal is the signal ComReset, the SATA device 110 replies with a signal ComInit to the host through the transmitters 111 of the SATA device 110. Then, after receiving the signal ComInit through the receiver 102 of the host 100, the host 100 adjusts its inner resistance and replies with a signal ComWake to the SATA device 110. After receiving the signal ComWake, the SATA device 110 also adjusts its inner resistance and outputs the ComWake signal.

After the host 100 receives the ComWake signal, the host 100 and the SATA device 110 perform a series of operations (e.g., host 100 and SATA device 110 align operations and host 100 and SATA device 110 synchronization operations). Therefore, the SATA channel can be established such that the host 100 and the SATA device 110 can communicate with each other through a SATA interface.

Figure 2:
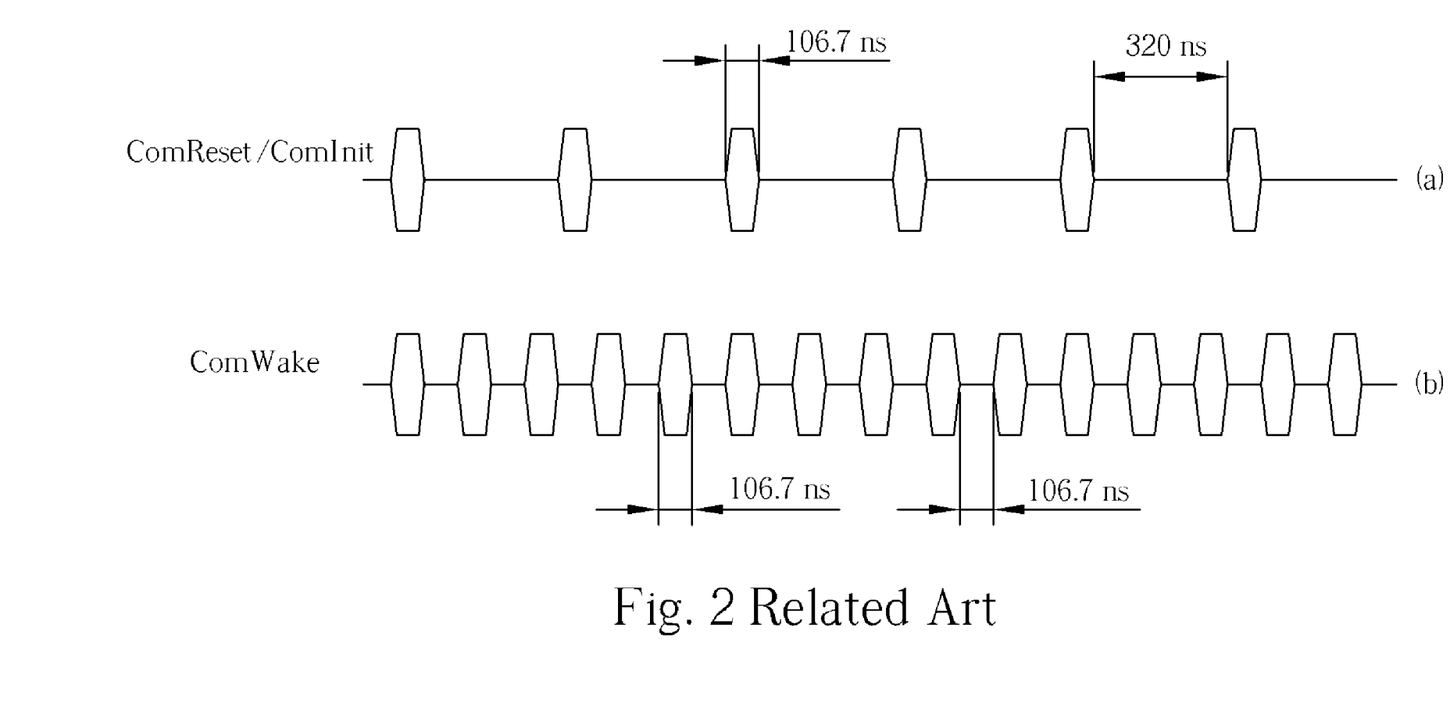
FIG. 2 is a waveform diagram of OOB signals ComReset, ComInit, and ComWake according to the related art.

Please refer to FIG. 2, which is a waveform diagram of OOB signals ComReset, ComInit, and ComWake according to the related art. As mentioned above, in order to establish the SATA channel(the handshaking mechanism), the host 100 and the SATA device 110 have to check the OOB signals and reply to each other by utilizing these signals. In fact, the SATA device 110 and the host 100 checks whether these OOB signals comply with specific waveforms in order to check whether the OOB signals are correct. Therefore, as shown in FIG. 2(a), the signals ComReset and ComInit have a specific waveform (pattern). That is, the signals ComReset and ComInit definitely have a plurality of bursts, where the width of each burst is 106.7 ns, and the time duration between every two successive bursts is 320 ns. Similarly, the signal ComWake, shown in the FIG. 2(b), also has a plurality of bursts, where the width of each burst is 106.7 ns, but the time duration between every two successive bursts is 106.7 ns. In general, these signals have a first state and a second state. The first state represents an idle state, and the second state represents a burst state. The time interval of the first state depends on different signals, as shown in FIG. 2. The burst contains four align primitives, and the align primitives are specific pattern, i.e. a plurality of pulses.

In implementation, the host 100 and the SATA device 110 utilizes a clock to count the burst and the time duration between two bursts in order to check the above-mentioned signals. Furthermore, the host 100 and the SATA device also utilize the clock to generate the response OOB signals, which comply with the above-mentioned patterns to each other such that the handshaking mechanism can be formed. Please note that the clock can be generated from a PLL circuit, which can utilize a crystal as its clock reference.

The determination circuit detects time period of first state and second state and recognizes the receiving signals is the COMRESET signal, the COMINIT signal, or the COMWAKE. Furthermore, the host 100 and the SATA device may utilize a clock to generate the response OOB signals, which comply with the above-mentioned waveform to each other such that the handshaking mechanism can be formed. Please note that the clock can be generated from a PLL circuit, which can utilize a crystal as its clock reference.

Unfortunately, the PLL circuit needs time to lock to a specific clock frequency. Therefore, when the PLL is in the process of locking to the specific clock frequency, but that the locking to the specific clock frequency has not yet been stabilized, the PLL generates incorrect clocks. In other words, when the output clock of the PLL circuit is not stabilized yet, the output clock cannot be utilized to generate OOB signals.

Please note that the incorrect clock can be divided into two different situations. That is, first, the frequency of the incorrect output clock may be too high (This means that the frequency of the incorrect output clock is over the acceptable working frequency range of the circuits of the SATA device.) Therefore, the unacceptable clock is impossible to be utilized. Second, the frequency of the incorrect output clock is in the acceptable working frequency range of the circuits of the SATA device, but not sufficient to generate correct OOB signals complying the specific waveform. In this situation, the circuits of the SATA device can utilize the acceptable clock to perform other tasks but generating the OOB signals.

However, in the above-mentioned two situations, the SATA device 110 cannot utilize the incorrect clocks to generate the OOB signals. Furthermore, if the SATA device 110 does utilize the incorrect clocks to generate the OOB signals, the host 100 may not recognize the COMINIT/COMWAKE.

In order to avoid the aforementioned problem, some related arts directly gate the output of the PLL circuit until the PLL circuit can generate the correct clock. This means that the PLL circuit ceases to output the incorrect output clock in the process of locking the reference clock. This can guarantee that no incorrect clock (including the acceptable clock and the high frequency clock) is outputted. In addition, other related arts show that the PLL circuit still sends out the incorrect clock to the SATA device 100 but the SATA device 110 will be reset before the PLL circuit generates the correct clock. Therefore, the SATA device 110 will properly utilize the correct clock without an error.

Apparently, the acceptable incorrect clocks can be utilized except generating the OOB signals, but the related art always ignore it. Therefore, according to the abovementioned related arts, some processing clock cycles (that is, the clock cycles of the acceptable clock) will be wasted for waiting for the generation of correct clock. For example, the acceptable incorrect clocks can be utilized to perform settings of transmit amplitude or to perform settings of SSC on/off.

SUMMARY

It is therefore one of primary objectives of the claimed invention to provide an automatic signal generating circuit for generating a validation signal and related method thereof, to solve the above-mentioned problem.

According to an exemplary embodiment of the claimed invention, a signal generating system for generating a validation signal is disclosed. The signal generating system comprises: a phase lock loop (PLL) for locking an output clock to a specific clock frequency; and a digital signal generation circuit. The digital signal generating circuit comprises: a triggering circuit, electrically coupled to the PLL, for determining whether the output clock of the PLL is in a frequency range, and outputting a triggering signal if the output clock is in a frequency range; and a signal generating device, electrically coupled to the triggering circuit and the PLL, for generating the validation signal according to the output clock when receiving the triggering signal; wherein before the output clock is in the frequency range, the PLL continuously outputs the output clock.

According to another exemplary embodiment of the claimed invention, a signal generating method for generating a validation signal having a specific waveform is disclosed. The signal generating method comprises: utilizing a phase lock loop (PLL) to lock an output clock to a specific clock frequency; detecting whether the output clock is in a frequency range; triggering a signal generating device to generate the validation signal according to the output clock if the output clock is in the frequency range; and before the output clock is in the frequency range, utilizing the PLL to continuously output the output clock.

According to another exemplary embodiment of the claimed invention, a signal generating system for generating a validation signal is disclosed. The signal generating system comprises: a phase lock loop (PLL) for locking an output clock to a specific clock frequency; and a digital signal generation circuit, which comprises: a verifying circuit, electrically coupled to the PLL, for determining whether the output clock of the PLL is in a desired frequency range, and outputting a verifying signal if the output clock is in a desired frequency range; and a signal generating device, electrically coupled to the verifying circuit and the PLL, for continuously generating signals according to the output clock until receiving the verifying signal; wherein the signal generated by the signal generating device when the output clock is in the desired frequency range is the validation signal.

According to another exemplary embodiment of the claimed invention, a signal generating system for generating a validation signal is disclosed. The signal generating system comprises: a phase lock loop (PLL) for locking an output clock to a specific clock frequency; and a digital signal generation circuit, which comprises: a signal generating device, electrically coupled to the PLL, for continuously generating signals according to the output clock until receiving a verifying signal; a verifying circuit, electrically coupled to the signal generating device, for determining whether the signals outputted by the signal generating device complies with a predetermined format of the validation signal, and outputting the verifying signal if signals outputted by the signal generating device complies with a predetermined waveform of the validation signal.

The present invention signal generating system and related method thereof can utilize a triggering circuit to trigger a signal generating device when the output clock of the PLL is stable. Therefore, the PLL can continuously outputs the output clock so that even the acceptable incorrect output clock can be utilized for other tasks. (transmitting amplitude or set SSC on/off) This saves some clock cycles and the whole signal generating system can act as an automatic mechanism of generating a signal complying with a specific waveform.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
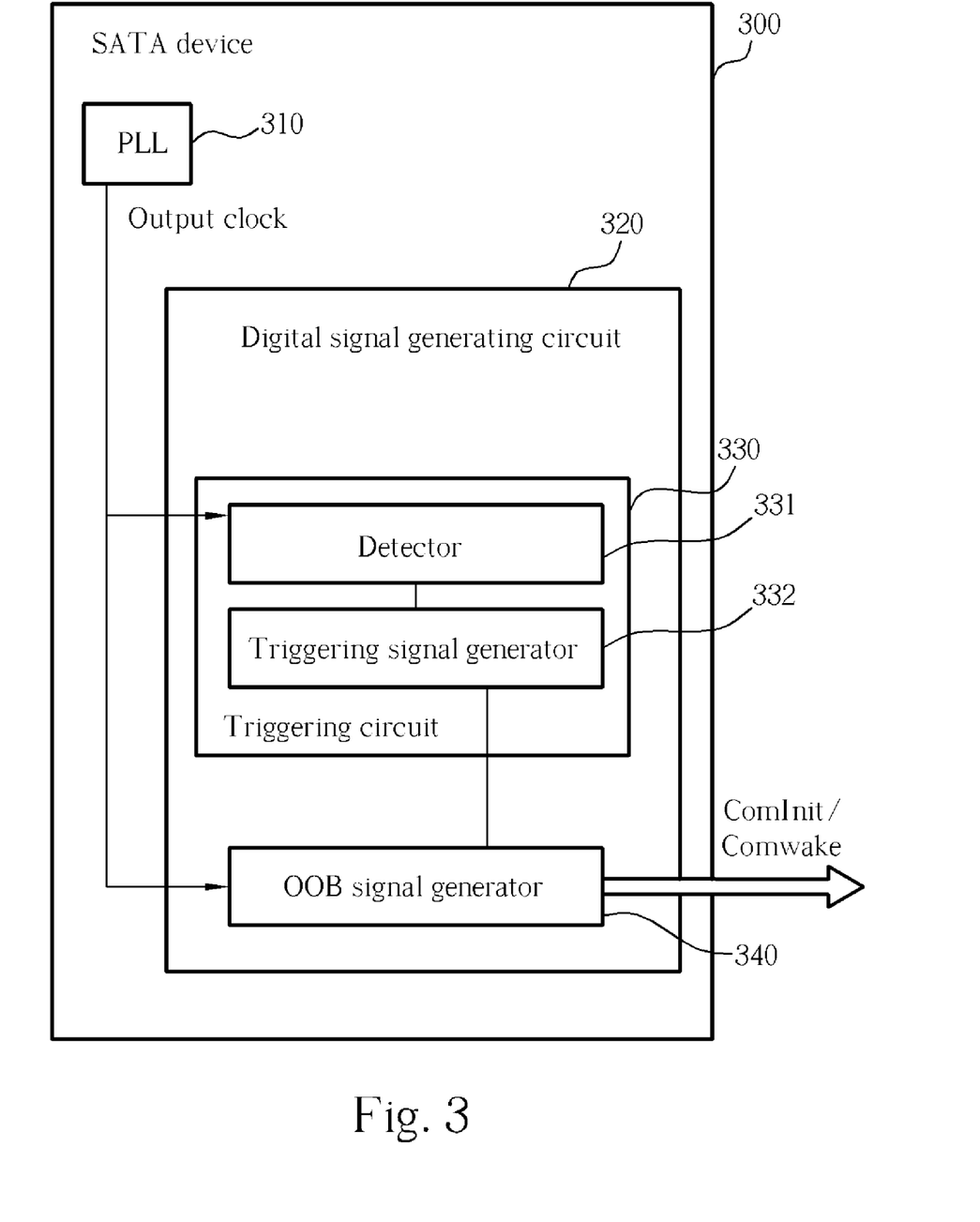
FIG. 3 is a diagram of the SATA device of an embodiment according to the present invention.

Please refer to FIG. 3, which is a diagram of the SATA device 300 of an embodiment according to the present invention. As shown in FIG. 3, the SATA device 300 comprises a PLL 310 and a digital signal generating circuit 320. The digital signal generating circuit 320 comprises a triggering circuit 330, an OOB signal generator 340. The PLL 310 is electrically coupled to the triggering circuit 330. The OOB signal generator 340 is electrically coupled to the triggering circuit and the PLL 310.

As mentioned previously, the PLL 310 is utilized to lock an output clock to a specific clock frequency. Please note that the circuits, functions, and operations of the PLL 310 are well known, thus their descriptions are omitted here. For example, because the PLL 310 can comprise a frequency divider, the frequency of the output clock of the PLL can be the same as the specific clock frequency or times of the specific clock frequency.

The OOB signal generator 340 is utilized to generate the ComInit OOB and output the ComInit OOB to the host. Because the signal ComInit must also comply with the specific waveform, it is also necessary that the OOB signal generator 340 must utilize the output clock generated by the PLL 310 to generate the ComInit/ComWake OOB. As mentioned previously, the PLL 310 requires a period of time to lock to the specific frequency, and the clock generated by the PLL 310 in that period is not able to be utilized in the related art.

Therefore, the present invention provides a triggering circuit 330 to protect the OOB signal generator 340 from utilizing incorrect clock. The triggering circuit 330 comprises a detector 331 and a triggering signal generator 332, which is electrically coupled to the detector 331 and the OOB signal generator 340. The detector 331 is utilized to determine whether the output clock can be utilized. That is, if the output clock can be utilized, the output clock should be in an available working frequency range of the OOB signal generator 340 or other logic circuits. Therefore, the specific clock frequency can be set as any frequency in the working frequency range or very close to the working frequency range. Therefore, when the output clock is locked to the specific frequency, the output clock is in the working frequency range.

On the other hand, the detector 331 can also compare the specific clock frequency with the frequency of the output clock to determine the frequency of the output clock is close to the specific clock frequency. Therefore, if the frequency difference between the output clock and the specific clock frequency is low enough, the output clock is in the working frequency range and capable of being utilized. Surely, the detector 331 is not limited to utilize the specific clock frequency to perform the comparison operation. That is, the detector 331 can utilize any reasonable frequency to perform the comparison operation. This change also obeys the spirit of the present invention. Furthermore, the detector 331 can detect a predetermined time period such that the PLL 310 definitely outputs the output clock, which is capable of being utilized, after the predetermined time period.

At last, if the output clock is determined to be in the working frequency range, this means that the output clock can be definitely utilized by the OOB signal generator 340 to generate correct OOB signals. Therefore, the detector 331 will send out an enable signal to the triggering signal generator 332. When the triggering signal generator 332 receives the enable signal, the triggering signal generator 332 outputs a triggering signal to the OOB signal generator 340 such that the OOB signal generator 340 is enabled to utilize the output clock to generate the ComInit/ComWake OOB, which complies with the specific waveform.

Figure 4:
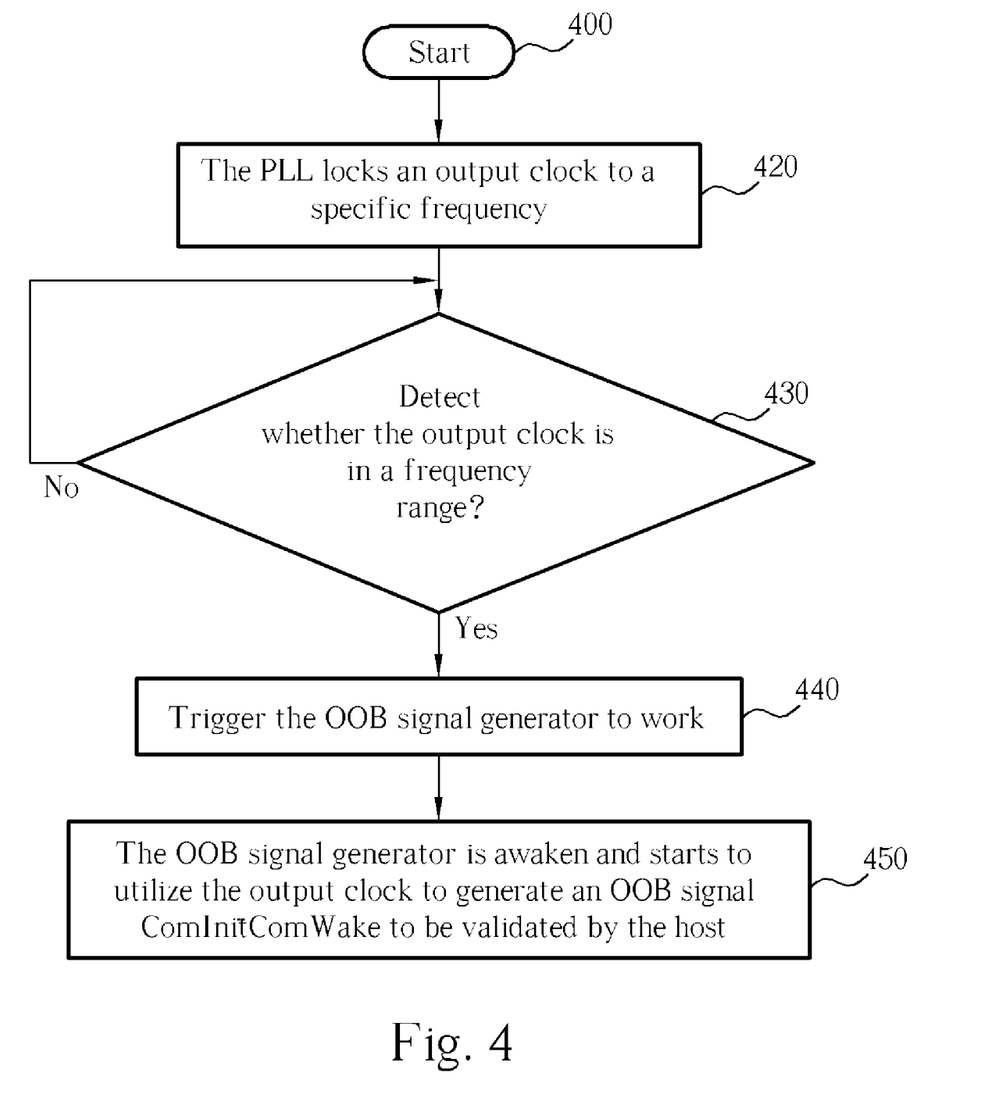
FIG. 4 is a flow chart of the SATA device shown in FIG. 3 when performing the OOB signal generating operation.

Please refer to FIG. 4, which is a flow chart of the SATA device 300 when performing the OOB signal generating operation as shown in FIG. 3. The operation comprises the following steps:

Step 400: Start;
Step 420: The PLL 310 locks an output clock to a specific frequency;
Step 430: The detector 331 of the triggering circuit 330 detects whether the output clock is in a working frequency range. If yes, go to step 440, otherwise, continue comparing the reference clock with the output clock;
Step 440: The triggering signal generator 332 of the triggering circuit 330 triggers the OOB signal generator 340 to work; and
Step 450: The OOB signal generator 340 is awaken by the triggering signal generator 332 and starts to utilize the output clock to generate an OOB signal ComInit/ComWake to be validated by the host.

The PLL 310 locks an output clock to a specific frequency (step 420). Please note, that before the output clock becomes stable, the OOB signal generator 340 is not yet working. At the same time, the detector 331 of the triggering circuit 330 determines whether the output clock is in the working frequency range of the OOB signal generator 340. If yes, the output clock can be utilized to generate the signal ComInit/ComWake.

Therefore, the detector 331 of the triggering circuit 330 detects that the output clock can be utilized. As mentioned previously, the detector 331 can compare the output clock with the specific frequency or any other reasonable frequency to detect whether the output clock can be utilized. Or the detector 331 can just wait for a predetermined time period, which is utilized for the PLL 310 to lock the output clock to a specific frequency. After the detector 331 detects that the output clock is available, the detector 331 sends an enable signal to the triggering signal generator 332. And then, the triggering signal generator 332 receives the enable signal from the detector 331, the triggering signal generator 332 outputs a triggering signal to trigger the OOB signal generator 340 (Step 440).

Moreover, the OOB signal generator 340 does not work when the output clock is incorrect (including the incorrect output clock is acceptable). After the OOB signal generator 340 receives the triggering signal, the OOB signal generator 340 is awaken by the triggering signal and starts to work. That is, the OOB signal generator 340 starts to utilize the correct output clock to generate the OOB signal ComInit because of the triggering signal (Step 450).

Please note that the output clock of the PLL 310 is outputted continuously. But the OOB signal generator 340 works only if the output clock is correct. In other words, the OOB signal generator 340 only utilizes the correct output clock to generate the OOB signal ComInit. Therefore, the incorrect output clock does not influence the operation of the OOB signal generator 340. Moreover, because the output clock of the PLL 310 is outputted all the time, the acceptable output clock can still be utilized to drive other logic circuits (not shown) to perform other logic operations. This means some clock cycles can be saved.

In the present invention, because the output clock is outputted continuously, but the unacceptable clock may damage the inner circuits, there are some comments for the present invention to ensure that the output clock is always acceptable. In other words, in order to avoid the unacceptable clock, the frequency of the output clock cannot be over the range of working frequency. Therefore, the PLL 310 has to be designed as follows. First, the PLL 310 locks the reference clock from a low frequency. Second, the frequency variation (phase margin) of the PLL 310 is limited such that the frequency does not overshoot too much. The two limitations can ensure the frequency of the output clock is never too high to be over the range such that the inner logic circuit of the SATA device 300 is able to always utilize the output clock.

Figure 5:
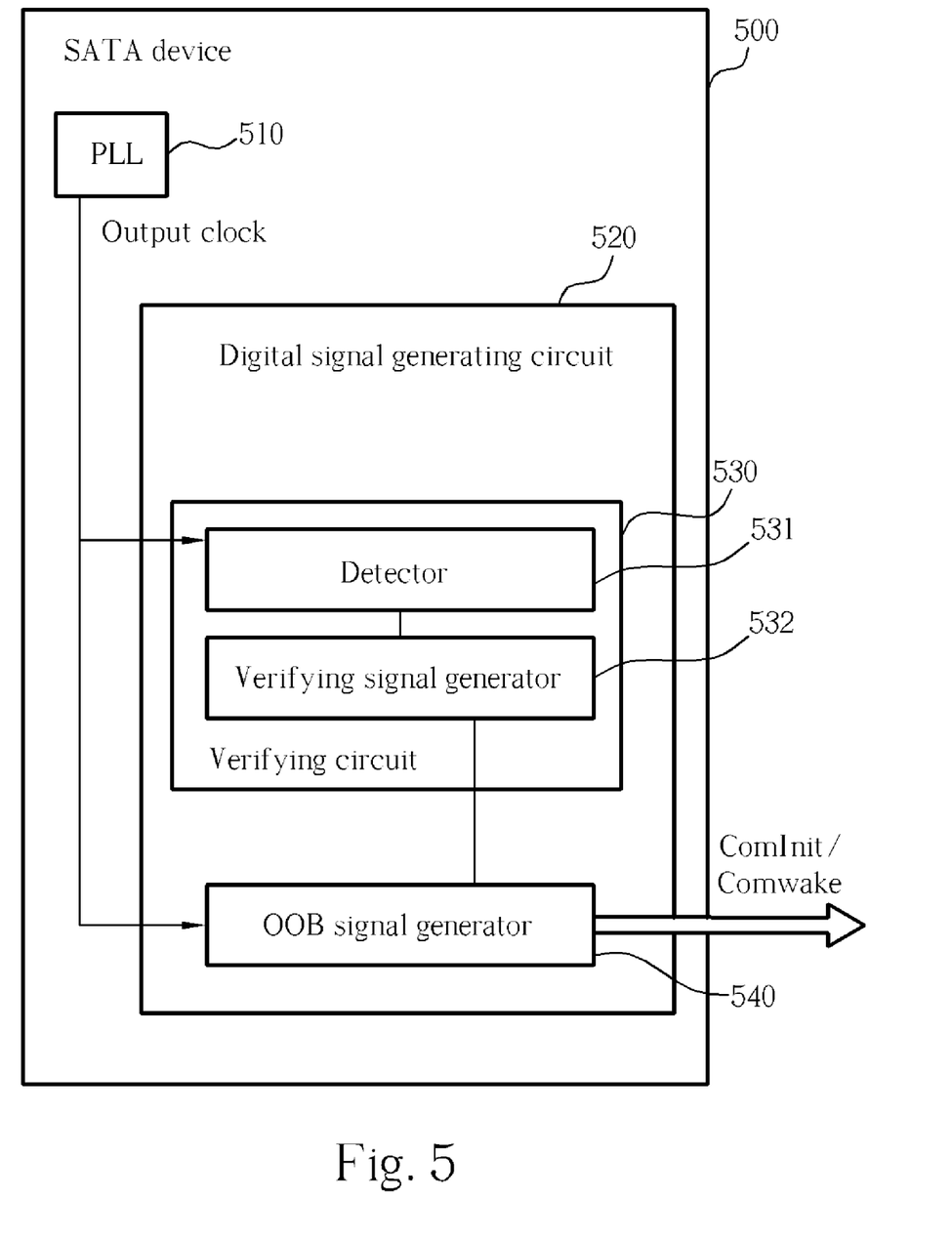
FIG. 5 is a diagram of a SATA device of another embodiment according to the present invention.

Please refer to FIG. 5, which is a diagram of a SATA device 500 of another embodiment according to the present invention. As shown in FIG. 5, the SATA device 500 comprises a PLL 510 and a digital signal generating circuit 520. The digital signal generating circuit 520 comprises an OOB signal generator 540, coupled to the PLL 510, and a verifying circuit 530, coupled to the OOB signal generator 540 and the PLL 510.

The verifying circuit 530 comprises a detector 531 and a verifying signal generator 532. Please note, in this embodiment, because the PLL 510 is not gated so that the PLL 510 continuously outputs the output clock to the detector 531 and the OOB signal generator 540. Therefore, the OOB signal generator 540 continuously generates signals according to the output clock. As mentioned previously, because the PLL 510 needs time to lock the output clock to a predetermined clock frequency, when the output clock is not stable yet, the OOB signal generator 540 cannot generate correct OOB signal ComInit. On the other hand, when the output clock is stable (this means that the output clock is correct and in the working frequency range of the OOB signal generator 540), the OOB signal generator 540 can generate useful OOB signal ComInit to the host.

In this embodiment, the detector 531 detects whether the output clock is in the frequency range. Since the detector 531 and the OOB signal generator 540 receives the output clock from the PLL 510 at the same time, when the detector 531 determines that the output clock is in the frequency range, this implies that the OOB signal generator 540 has outputted a valid OOB signal ComInit to the host.

Therefore, the detector 531 informs the verifying signal generator 532 such that the verifying signal generator 532 outputs a verifying signal to the OOB signal generator 540. Since the OOB signal generator 540 has outputted a valid OOB signal ComInit to the host, the OOB signal generator 540 stops outputting any signals after sending this COMINIT completely when receiving the verifying signal. In other words, the verifying circuit 530 disclosed previously is utilized as a disabling device of the OOB signal generator 540. That is, the verifying circuit 530 ceases the operations of the OOB signal generator 540 if the OOB signal generator 540 has outputted needed ComInit signal.

Figure 6:
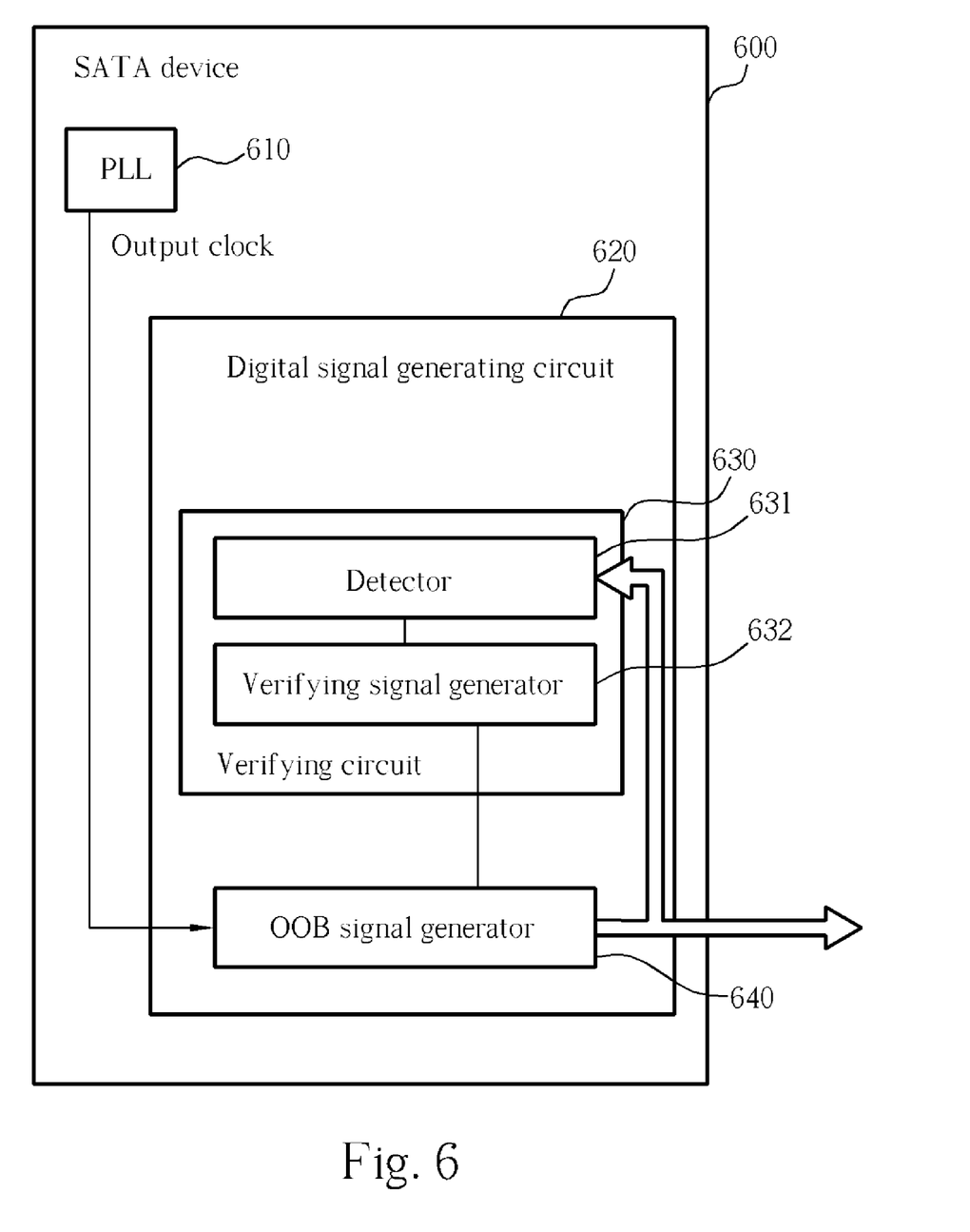
FIG. 6 is a diagram of a SATA device of the other embodiment according to the present invention.

In addition, please refer to FIG. 6, which is a diagram of a SATA device 600 of another embodiment according to the present invention. As shown in FIG. 6, the SATA device 600 comprises a PLL 610 and a digital signal generating circuit 620. The digital signal generating circuit 620 comprises an OOB signal generator 640, coupled to the PLL 610, and a verifying circuit 630, coupled to the OOB signal generator 640.

Similarly, the verifying circuit 630 comprises a detector 631 and a verifying signal generator 632. Please note, the detector 631 is coupled to the OOB signal generator 640 instead of the PLL 631.

In this embodiment, the detector 631 detects whether the signals outputted by the OOB signal generator 640 complies with the waveform of the ComInit signal. So if the detector 631 determines that signals outputted by the OOB signal generator 640 complies with the waveform of the ComInit, this implies that the OOB signal generator 640 has outputted a valid ComInit signal to the host.

Therefore, the detector 631 informs the verifying signal generator 632 such that the verifying signal generator 632 outputs a verifying signal to the OOB signal generator 640. Since the OOB signal generator 640 has outputted a valid OOB signal ComInit to the host, the OOB signal generator 640 stops outputting any signals after sending this COMINIT signal completely when receiving the verifying signal. Similar to the above-mentioned embodiment, the verifying circuit 630 is utilized as a disabling device of the OOB signal generator 640. That is, the verifying circuit 630 ceases the operations of the OOB signal generator 640 if the OOB signal generator 640 has outputted needed ComInit signal.

Please note, in the above disclosure, it seems that the detectors 331, 531, 631 are implemented by pure hardware. But in fact, the detectors 331, 531, 631 can be implemented by firmware. That is, firmware can be also utilized to perform the aforementioned detection. This change also obeys the spirit of the present invention.

Please note that the concept of the present invention can be utilized in any device that utilizes an output clock to generate a signal to be validated (or a signal complying with a specific pattern). Therefore, the SATA interface is utilized as a preferred embodiment and is not a limitation. The present invention can be utilized in other interfaces. These changes also obey the spirit of the present invention.

Please note that the SATA devices 300, 500, 600 are only utilized as a preferred embodiment, not a limitation of the present invention. For example, the present invention can also be utilized in an SATA host, or SAS. Furthermore, the ComInit signal is also utilized as an embodiment. Apparently, the SATA devices 300, 500, 600 can also generate other OOB signals (such as the ComWake signal).

In contrast to the related art, the present invention signal generating system and related method thereof can utilize a triggering circuit to trigger a signal generating device when the output clock of the PLL is stable. Therefore, the PLL can continuously outputs the output clock so that even the acceptable incorrect output clock can be utilized for other tasks (set transmitting amplitude or set SSC on/off). This saves some clock cycles and the whole signal generating system can act as an automatic mechanism of generating a signal complying with a specific waveform.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal generating system for generating a validation signal, the signal generating system comprising:
   a phase lock loop (PLL) for locking an output clock to a specific clock frequency; and
   a digital signal generation circuit comprising:
      a triggering circuit, electrically coupled to the PLL, for determining whether the output clock of the PLL is in a frequency range, and outputting a triggering signal if the output clock is in a frequency range; and
      a signal generating device, electrically coupled to the triggering circuit and the PLL, for generating the validation signal according to the output clock when receiving the triggering signal;
   wherein before the output clock is in the frequency range, the PLL continuously outputs the output clock.

2. The signal generating system of claim 1, wherein the frequency range is a working frequency range of the signal generating device.

3. The signal generating system of claim 1, wherein the triggering circuit comprises:
   a detector for determining whether the output clock is in the frequency range; and
   a triggering signal generating device, electrically connected to the detector, for generating the triggering signal if the output clock is in the frequency range.

4. The signal generating system of claim 1 being utilized in a serial ATA (SATA) device.

5. The signal generating system of claim 4, wherein the validation signal is an OOB signal.

6. The signal generating system of claim 1 being utilized in a (SAS) device.

7. The signal generating system of claim 6, wherein the validation signal is an OOB signal.

8. The signal generating system of claim 1 being utilized in a host, wherein the validation signal is an OOB signal complying with a serial ATA (SATA) specification.

9. The signal generating system of claim 1, wherein a frequency of the output clock is not larger than a largest frequency in the frequency range.

10. A signal generating method for generating a validation signal having a specific waveform, the signal generating method comprising:
   utilizing a phase lock loop (PLL) to lock an output clock to a specific clock frequency;
   detecting whether the output clock is in a frequency range;

triggering a signal generating device to generate the validation signal according to the output clock if the output clock is in the frequency range; and before the output clock is in the frequency range, utilizing the PLL to continuously output the output clock.

11. The signal generating method of claim 10 wherein the frequency range is a working frequency range of the signal generating device.

12. The signal generating method of claim 10 being utilized in a serial ATA (SATA) device.

13. The signal generating method of claim 12, wherein the validation signal is an OOB signal.

14. The signal generating method of claim 10 being utilized in a host, wherein the validation signal is an OOB signal complying with a serial ATA (SATA) specification.

15. The signal generating method of claim 10, wherein a frequency of the output clock is not larger than a largest frequency in the frequency range.

16. A signal generating system for generating a validation signal, the signal generating system comprising:
    a phase lock loop (PLL) for locking an output clock to a specific clock frequency; and
    a digital signal generation circuit comprising:
        a verifying circuit, for receiving a first signal and outputting a verifying signal if the signal complies with a predetermined condition; and
        a signal generating device, electrically coupled to the verifying circuit and the PLL, for continuously generating a signal according to the output clock until receiving the verifying signal;
    wherein the signal generated by the signal generating device is the validation signal when the first signal complies with the predetermined condition.

17. The signal generating system of claim 16, wherein the verifying circuit is electrically coupled to the PLL, the first signal is the output clock, and the verifying circuit determines that the first signal complies with the predetermined condition if the output clock is in a desired frequency range.

18. The signal generating system of claim 17, wherein the desired frequency range is a working frequency range of the signal generating device.

19. The signal generating system of claim 18, wherein the verifying circuit comprises:
    a detector, electrically coupled to the PLL, for determining whether the output clock is in the working frequency range of the signal generating device; and
    a verifying signal generating device, electrically coupled to the detector, for generating the verifying signal if the output clock is in the working frequency range of the signal generating device.

20. The signal generating system of claim 16, wherein the verifying circuit is electrically coupled to the signal generating device, the first signal is the signal outputted from the signal generating device, and the verifying circuit determines that the first signal complies with the predetermined condition if the first signal complies with a predetermined waveform of the validation signal.

21. The signal generating system of claim 20, wherein the verifying circuit comprises:
    a detector for determining whether the first signal complies with the predetermined waveform of the validation signal; and
    a verifying signal generating device, electrically coupled to the detector, for generating the verifying signal if the first signal complies with the predetermined waveform of the validation signal.

22. The signal generating system of claim 16 being utilized in a serial ATA (SATA) device.

23. The signal generating system of claim 22, wherein the validation signal is an OOB signal.

24. The signal generating system of claim 16 being utilized in an SAS device.

25. The signal generating system of claim 24, wherein the validation signal is an OOB signal.

26. The signal generating system of claim 16 being utilized in a host, wherein the validation signal is an OOB signal complying with a serial ATA (SATA) specification.

27. A signal generating method for generating a validation signal having a predetermined waveform, the signal generating method comprising:
    utilizing a phase lock loop (PLL) to lock an output clock to a specific clock frequency;
    utilizing a signal generating device to generate a signal according to the output clock;
    detecting whether the output clock is in a frequency range or the signal outputted from the signal generating device complies with the predetermined waveform of the validation signal; and
    if the output clock is in the frequency range or the signal outputted from the signal generating device complies with the predetermined waveform, stopping the signal generating device outputting the signal.

28. The signal generating method of claim 27, wherein the desired frequency range is a working frequency range of the signal generating device.

29. The signal generating method of claim 27 being utilized in a serial ATA (SATA) device.

30. The signal generating method of claim 29, wherein the validation signal is an OOB signal.

31. The signal generating method of claim 27 being utilized in a host, wherein the validation signal is an OOB signal complying with a serial ATA (SATA) specification.

32. The signal generating method of claim 27 being utilized in an SAS device.

33. The signal generating method of claim 32, wherein the validation signal is an OOB signal.

* * * * *

UNITED STATES PATENT AND TRADEMARK OFFICE
CERTIFICATE OF CORRECTION

PATENT NO.        : 7,272,673 B2                                           Page 1 of 1
APPLICATION NO.   : 11/163899
DATED             : September 18, 2007
INVENTOR(S)       : Chuan Liu et al.

It is certified that error appears in the above-identified patent and that said Letters Patent is hereby corrected as shown below:

On the title page item (73), correct the residence of the assignee from "Hsin-Chi" to -- Hsin-Chu --.

Signed and Sealed this

Eighteenth Day of December, 2007

JON W. DUDAS
*Director of the United States Patent and Trademark Office*